United States Patent [19]

Kaun et al.

[11] 4,324,846
[45] Apr. 13, 1982

[54] NEGATIVE ELECTRODE COMPOSITION

[75] Inventors: Thomas D. Kaun, New Lenox; Albert A. Chilenskas, Western Springs, both of Ill.

[73] Assignee: The United States of America as represented by the United States Department of Energy, Washington, D.C.

[21] Appl. No.: 177,323

[22] Filed: Aug. 12, 1980

[51] Int. Cl.$^3$ .................... H01M 4/40; H01M 4/46
[52] U.S. Cl. .................... 429/112; 75/124; 75/134 F; 75/138; 75/144; 429/218; 429/221
[58] Field of Search ............ 429/218, 221, 112; 75/124, 134 F, 138, 144, 170; 252/182.1

[56] References Cited
U.S. PATENT DOCUMENTS

| | | | |
|---|---|---|---|
| 3,607,413 | 9/1971 | Busselli | 136/76 |
| 3,957,532 | 5/1976 | Settle et al. | 136/75 |
| 4,011,372 | 3/1977 | Tomczuk et al. | 429/218 |
| 4,076,905 | 2/1978 | Sammells | 429/112 |
| 4,079,303 | 3/1978 | Cox | 320/17 |
| 4,158,720 | 6/1979 | Kaun | 429/221 |

Primary Examiner—Donald L. Walton
Attorney, Agent, or Firm—Hugh W. Glenn; Robert J. Fisher; Richard G. Besha

[57] ABSTRACT

A secondary electrochemical cell and a negative electrode composition for use therewith comprising a positive electrode containing an active material of a chalcogen or a transition metal chalcogenide, a negative electrode containing a lithium-aluminum alloy and an amount of a ternary alloy sufficient to provide at least about 5 percent overcharge capacity relative to a negative electrode solely of the lithium-aluminum alloy, the ternary alloy comprising lithium, aluminum, and iron or cobalt, and an electrolyte containing lithium ions in contact with both of the positive and the negative electrodes. The ternary alloy is present in the electrode in the range of from about 5 percent to about 50 percent by weight of the electrode composition and may include lithium-aluminum-nickel alloy in combination with either the ternary iron or cobalt alloys. A plurality of series connected cells having overcharge capacity can be equalized on the discharge side without expensive electrical equipment.

19 Claims, 3 Drawing Figures

VOLTAGE-CAPACITY CURVE ILLUSTRATES FeS vs. 90% LiAl - 10% LiAlFe (5 A-hr).

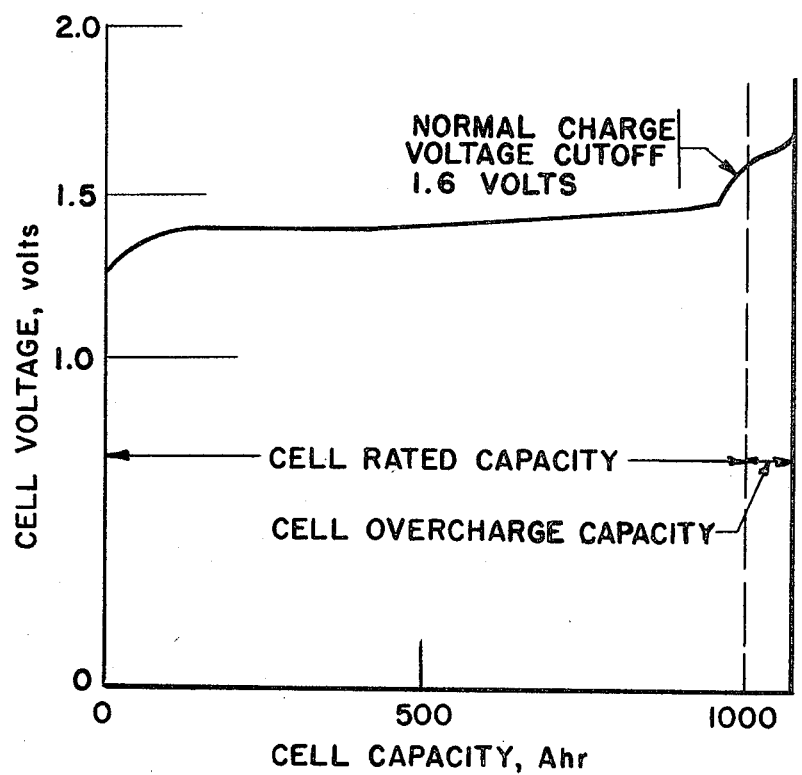

NEGATIVE ELECTRODE COMPOSITION

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to electrodes for use in secondary electrochemical cells. More particularly, it concerns a negative electrode composition and matched positive electrode within a cell which exhibits an overcharge capacity at high cell voltage.

A substantial amount of work has been done in the development of high-temperature, secondary electrochemical cells. Positive electrodes for these cells have included chalcogens such as sulfur, oxygen, selenium or tellurium as well as their transition metal chalcogenides. Positive electrode materials such as the sulfides of iron, cobalt, nickel and copper are of current interest.

In high temperature cells, current flow between electrodes often is transmitted by molten electrolytic salt. Particularly useful salts include compositions of the alkali metal halides and/or the alkaline earth metal halides ordinarily incorporating a salt of the negative electrode reactant metal, e.g. lithium. In cells operating at moderate temperatures, aqueous and organic base electrolytes are permissable and these also can include cations of the negative electrode metal.

Alkali metals such as lithium, sodium, potassium or alkaline earth metals including calcium, magnesium, and others and alloys of these materials are contemplated as negative electrode reactants. Alloys of these materials such as lithium-aluminum, lithium-silicon, lithium-magnesium, calcium-magnesium, calcium-aluminum, calcium-silicon and magnesium-aluminum have been investigated to maintain the negative electrode in solid form and thereby improve retention of the active material at high cell operating temperatures.

One of the disadvantages connected with a battery comprised of a plurality of series connected secondary electrochemical cells is the difficulty in equalizing the charge to the cells so that all cells are fully charged yet none is overcharged which may result in severe damage to various portions of the cell, such as to the current collectors. A method for equalizing a plurality of cells is disclosed in the Cox U.S. Pat. No. 4,079,303 issued Mar. 14, 1978 for Charging System And Method For Multicell Storage Batteries. This system involves a complex electronic equalizing apparatus which performs the equalization of the cells during charging.

It is desirable to design a secondary electrochemical cell which facilitates the equalization of a plurality of series connected cells without the expensive electrical method and apparatus disclosed in the Cox patent. Providing overcharge capacity to the cells permits equalization on the discharge side of the cell. That is, if a plurality of series connected cells each have overcharge capacity, then inherent variations in cell capacity, cell efficiency, cell temperature and other factors would not interfere with the equalization of the cells after a bulk charge. For example, parallel connection of a plurality of such cells would allow the cells having a higher charge to trickle charge cells having a lower charge.

An advantage of the lithium-aluminum electrode is the rise in the negative electrode potential (voltage discontinuity) at the end of the cell charge capacity which provides a ready indicator of when the cell is fully charged. This is an important feature of the lithium-aluminum electrode for preventing overcharge damage to the current collector and the like. One of the disadvantages of lithium alloy negative electrodes, such as lithium-aluminum electrodes has been the reduced cell voltage as compared to negative electrodes containing molten lithium. The reduced cell voltage and power have been accepted in order to obtain the enhanced electrode and cell stability afforded by solid lithium alloys.

Some of the disadvantages of lithium alloy negative electrodes and particularly the lithium-aluminum electrode have been avoided by electrodes disclosed in U.S. Pat. No. 4,158,720 issued June 19, 1979 to Kaun, one of the inventors herein, for Lithium-Aluminum Iron Electrode Compositions. Unfortunately, an electrode of the ternary alloy disclosed therein does not impart a second plateau in cell potential after the cell is fully charged, an advantageous aspect that can provide overcharge capacity to prevent overcharge damage to cell components.

It has been found that cells having a negative electrode which is a combination of a lithium-aluminum alloy and a ternary alloy including lithium and aluminum are endowed with an overcharge capacity which permits cell equalization on the discharge side while at the same time retaining the previously discussed very desirable characteristics of the lithium-aluminum electrode.

Literature pertinent to the subject matter of the present invention includes the Tomczuk et al U.S. Pat. No. 4,011,372, issued Mar. 8, 1977, for "Method of Preparing A Negative Electrode Including Lithium Alloy For Use Within A Secondary Electrochemical Cell". This patent discloses a particular method of electrode preparation and suggests the use of a lithium-aluminum, lithium-magnesium and lithium-silicon alloys. The reference, however, does not disclose or teach the use of lithium-aluminum ternary compositions as additives to lithium-aluminum electrodes to provide overcharge capacity thereto.

The Settle et al U.S. Pat. No. 3,957,532, issued May 17, 1976 for "Method of Preparing An Electrode Material of Lithium-Aluminum Alloy" discloses the various phases and compositions of lithium-aluminum alloys that are appropriate for use as a negative electrode material. However, no disclosure is made to suggest the addition of certain amounts of ternary lithium-aluminum alloys to provide electrode overcharge capacity.

The Buzzelli U.S. Pat. No. 3,607,413 issued Sept. 21, 1971 for "Method For Electrochemical Alloying of Aluminum and Lithium" teaches negative electrodes of lithium-aluminum alloys with the suggestion that they may contain less than 10 weight percent impurities of, for example, copper, magnesium manganese, indium and iron. No suggestion is made in this patent of a ternary lithium-aluminum alloy as a negative electrode additive to effect electrode overcharge capacity.

SUMMARY OF THE INVENTION

The invention pertains to a negative electrode composition for use in a secondary electrochemical cell which provides overcharge capacity providing protection to cell components during charge and enabling cell equalization on the discharge side.

It is an important object of the present invention to provide a negative electrode composition for use in a secondary electrochemical cell comprising a lithium-aluminum alloy and an amount of a ternary alloy sufficient to provide greater charge capacity than a negative electrode of the lithium-aluminum alloy while retaining a discontinuity in the cell voltage when the cell is substantially fully charged, the ternary alloy comprising lithium and an aluminum-iron alloy or an aluminum-cobalt alloy or mixtures thereof.

Another object of the present invention is to provide a negative electrode composition of the type set forth in which a lithium-aluminum alloy having between about 5 and about 50 atom percent lithium and an amount of a ternary lithium-aluminum-iron alloy sufficient to provide an overcharge capacity relative to the negative electrode solely of the lithium-aluminum alloy in a range of from about 5 percent to about 50 percent.

A still further object of the present invention is to provide a secondary electrochemical cell comprising a positive electrode containing an active material of a chalcogen or a transition metal chalcogenide, a negative electrode containing a lithium-aluminum alloy and an amount of a ternary alloy sufficient to provide at least about a 5 percent overcharge capacity relative to a negative electrode solely of the lithium-aluminum alloy, the ternary alloy comprising lithium, aluminum, and iron or cobalt and an electrolyte containing lithium ions in contact with both the positive and negative electrodes.

In accordance with the present invention, a negative electrode composition for use in a secondary, high-temperature electrochemical cell is presented along with a method for equalizing a plurality of series connected cells. Each cell includes an electrolyte containing lithium ions and a positive electrode including chalcogens or transition metal chalcogenides.

The negative electrode composition comprises about 80 to 95 weight percent of a lithium-aluminum alloy and about 5 to about 20 weight percent of a ternary alloy which comprises about 5 to 50 atom percent lithium and about 50 to 95 atom percent of an alloy of aluminum and iron or aluminum and cobalt or mixtures thereof or either of the iron or cobalt ternary alloys in combination with a lithium-aluminum nickel ternary alloy, as will be explained.

In a specific aspect of the invention, the aluminum-iron alloy includes the intermetallic compound $Fe_2Al_5$. This compound, when saturated with lithium, provides not only an increased lithium activity and increased electrode voltage over that of a comparable lithium-aluminum alloy but most importantly provides overcharge capacity with respect to the usual lithium-aluminum electrode. Therefore, it is preferred that the uncharged or discharged electrode composition include $Fe_2Al_5$ in a major proportion of the ternary alloy of the electrode composition. The aluminum-iron alloy is preferably provided in ratios of about 1 atom part iron to about 2 to 3 atom parts aluminum so as to form a major proportion of the intermetallic compound $Fe_2Al_5$. Minor amounts of the intermetallic compounds $FeAl_2$ or $FeAl_3$ may appear within the composition depending on the exact ratio of aluminum to iron.

Although some $Fe_2Al_5$ is expected to be present in aluminum-iron alloys of 20 to 35 atom percent iron, this preferred intermetallic compound predominates within the compositional ranges of 25 to 33 atom percent iron and 67 to 75 atom percent aluminum. It should be in greatest proportion at its stoichiometric ratio of 71 atom percent aluminum and 29 atom percent iron, that is, about 70 atom percent aluminum and about 30 atom percent iron. This stoichiometric proportion of aluminum and iron, i.e., 5:2, in this intermetallic compound is therefore a preferred compostional relationship for the ternary alloy portion of the inventive electrode material.

The electrode material can, in the fully charged state, include as much lithium as practical to permit the electrode material to remain in the solid state at the cell operating temperatures. Lithium concentrations of between 5 and 50 atom percent throughout the electrochemical cycle are contemplated.

In another specific aspect of the invention, the aluminum-cobalt alloy includes the intermetallic compound $Co_2Al_5$. This compound, when saturated with lithium provides no only an increased lithium activity and increased electrode voltage over that of a comparable lithium-aluminum alloy but most importantly provides overcharge capacity with respect to the usual lithium-aluminum electrode. Therefore, it is preferred that the uncharged or discharged electrode composition include $Co_2Al_5$ in major proportion within the ternary alloy of the electrode composition. Other intermetallic compounds such as $CoAl_2$ or $CoAl_3$ may appear within the composition depending on the exact ratio of cobalt to aluminum; however, the aluminum-cobalt alloy is preferably provided in ratios of about 1 atom part cobalt to about 2 to 3 atom parts aluminum so as to form a major proportion of the intermetallic compound $Co_2Al_5$.

Although some $Co_2Al_5$ is expected to be present in aluminum-cobalt alloys of 18 to 48 atom percent cobalt, the preferred intermetallic compound predominates within the compositional ranges of 25 to 33 atom percent cobalt and 67 to 75 atom percent aluminum. It should be in greatest proportion and in stoichiometric ratio of 71 atom percent aluminum and 29 atom percent cobalt, that is, about 70 percent aluminum and about 30 percent cobalt. This stoichiometric proportion of aluminum and cobalt, i.e., 5:2, in this intermetallic compound is therefore a preferred compositional relationship for the ternary alloy portion of the electromaterial of this invention.

The electrode material can, in the fully charged state, include as much lithium as practical to permit the electrode material to remain in the solid state at the cell operating temperatures. Lithium concentrations of between about 5 and about 40 atom percent throughout the electrochemical cycle are contemplated.

In another aspect of the invention, an aluminum-nickel alloy including the intermetallic compound $NiAl_3$ is used in amounts less than 50 percent by weight in combination with either the aluminum-iron alloy or the aluminum-cobalt alloy previously discussed. The nickel alloy, when saturated with lithium, and in combination with either the aluminum-iron or aluminum-cobalt alloy provides not only increased lithium activity and increased electrode voltage over that of a comparable lithium-aluminum alloy but most importantly provides overcharge capacity with respect to the usual lithium-aluminum electrode. Therefore, it is preferred that the uncharged or discharged electrode composition include mixtures of either the iron or cobalt-aluminum alloy along with a minor proportion of nickel-aluminum alloy. The aluminum-nickel is preferably provided in ratios of about 1 atom part nickel to about 3 atom parts aluminum so as to form a major proportion of the intermetallic compound NiAl$_3$.

Although some NiAl$_3$ is expected to be present in the aluminum-nickel alloys of 24 to 42 atom percent nickel, the preferred intermetallic compound predominates in the compositional ranges of about 24 to about 30 atom percent nickel and about 70 to 76 atom percent aluminum. It should be in the greatest proportion at its stoichiometric ratio of 75 atom percent aluminum and 25 atom percent nickel. This stoichiometric proportion of aluminum and nickel, i.e. 3:1, in this intermetallic compound is therefore a preferred compositional relationship for the nickel ternary alloy portion of the inventive electrode material.

The electrode material can, in the fully charged state, include as much lithium as practical to permit the electrode material to remain in the solid state at cell operating temperatures. Lithium concentrations of between about 5 and about 40 atom percent throughout the electrochemical cycle are contemplated.

DESCRIPTION OF THE FIGURES

FIG. 3 is a graph of a cell voltage versus cell capacity showing a cell with a 10 percent overcharge capacity.

DETAILED DESCRIPTION OF THE INVENTION

Figure 1:
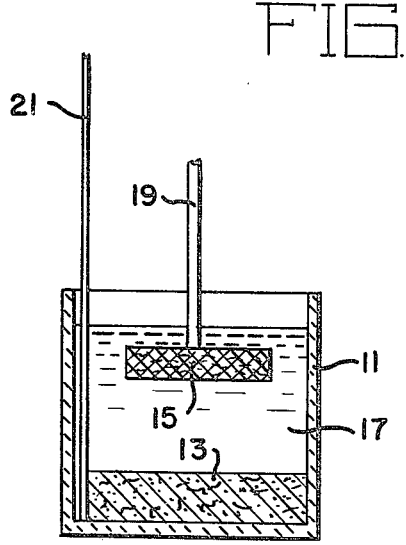
FIG. 1 is a schematic illustration of an electrochemical cell that can be used in testing the electrode composition of the present invention.

The improved electrode composition of the present invention includes as a major constituent thereof, that is in the range of from about 50 percent by weight to about 95 percent by weight, lithium-aluminum alloy. To the lithium-aluminum alloy is added a ternary alloy of lithium-aluminum and one of iron or cobalt or mixtures thereof or mixtures of ternary compounds of lithium-aluminum-iron or cobalt and lithium-aluminum-nickel.

Where the ternary lithium-aluminum-iron alloy is included in the electrode composition, sufficient iron is present in the original aluminum-iron alloy to produce substantial amounts of the intermetallic compound Fe$_2$Al$_5$. Generally, iron is present in the range of between about 25 to about 33 atom percent and aluminum is present in the range of between about 67 to 75 atom percent so as to ensure that the intermetallic compound Fe$_2$Al$_5$ will appear in major amounts relative to the other iron-aluminum intermetallics.

Lithium in amounts of between about 5 to about 50 atom percent is added by direct contact or by electrodeposition into the alloy of iron and aluminum. The lithium concentration is limited by its propensity to form molten phases with the alloy components at high temperatures and high lithium concentrations. 50 atom percent lithium is selected as a practical limit for cells operating in the 350° C. to 550° C. temperature range suitable for molten electrolytes. Higher lithium concentrations may be selected for cells capable of operating at lower temperatures such as with molten salt eutectics having low melting points or with aqueous or organic base electrolytes containing lithium ions.

As before stated, the preferred addition of ternary alloy to the lithium-aluminum electrode is in the range of from about 5 percent by weight to about 20 percent by weight. The preferred ternary compound is lithium-aluminum-iron and is comprised of lithium in the amount of about 5 to 50 atom percent and an intermetallic compound Fe$_2$Al$_5$ wherein 20 to 35 atom percent iron is present and preferably 25 to 33 atom percent iron with aluminum being present in the range of between about 67 to 75 atom percent, thereby to ensure the principal intermetallic being Fe$_2$Al$_5$ rather than other intermetallics such as FeAl$_2$ and FeAl$_3$.

The use of alloys of aluminum-iron containing substantially less than 20 atom percent iron or being present in the amount less than about 5 weight percent of the electrode do not provide the increased lithium activity and the overcharge capability previously discussed. Where iron is present in less than 20 atom percent quantities, then the preferred intermetallic Fe$_2$Al$_5$ is not formed and the desired overcharge capability is not achieved. On the otherhand, alloys having greater than 35 atom percent iron are expected to include principally FeAl$_2$ and little Fe$_2$Al$_5$, again a result not desired.

Other ternary alloys acceptable to provide the desired overcharge capability are lithium-aluminum-cobalt wherein the intermetallic compound Co$_2$Al$_5$ is preferred. Accordingly, aluminum-cobalt alloys of 18 to 48 atom percent cobalt should include the preferred compound with the compositional ranges of 25 to 33 atom percent cobalt and 67 to 75 atom percent aluminum ensuring a predominant quantity of the desired intermetallic. The stoichiometric ratios are 71 atom percent aluminum and 29 atom percent cobalt, that is about 70 percent aluminum and 30 percent cobalt thereby ensuring the ratio of 5:2 to provide the desired intermetallic compound.

Lithium concentrations of between about 5 and 40 atom percent are ensured by direct contact or by electrodeposition into the alloy of cobalt and aluminum. The lithium concentration is limited by the same factors set forth with respect to iron.

The use of alloys of aluminum-cobalt containing substantially less than 18 atom percent cobalt or less than 5 weight percent of the alloy in the electrode do not provide the increased lithium activity attributable to the Co$_2$Al$_5$ intermetallic compound and the required overcharge capacity. Similarly, alloys having greater than 48 atom percent cobalt are not desired since little Co$_2$Al$_5$ would be formed.

Another ternary alloy providing the overcharge capacity is a combination of the ternary lithium-aluminum-iron or lithium-aluminum-cobalt with an addition thereto of a lithium-aluminum-nickel alloy. The lithium-aluminum-nickel is not acceptable as a ternary addition alone but in combination with either the ternary iron or the ternary cobalt alloy the ternary nickel alloy is acceptable. In this case however it is required that the ternary nickel alloy be present in an amount less than about 50 percent by weight of the total ternary alloy present. The weight requirements for the total amount of ternary alloy in the electrode, this being in the range of between about 5 and about 20 weight percent, remains the same.

The preferred aluminum-nickel alloy includes the intermetallic compound NiAl$_3$ which is expected to be present in an aluminum-nickel alloy of 24 to 42 atom percent nickel, the preferred intermetallic compound predominating in the compositional ranges of about 24 to about 30 atom percent nickel and about 70 to 76 atom percent aluminum. The desired intermetallic nickel NiAl$_3$ should be in the greatest proportion at its stoichiometric ratio of 75 atom percent aluminum and 25 atom percent nickel. This stoichiometric proportion of aluminum and nickel, i.e. 3:1 is the preferred compositional relationship for the nickel aluminum intermetallic than nickel-aluminum.

Lithium in the amounts of about 5 to about 40 atom percent is added by direct contact or by electrodeposition into the alloy of nickel and aluminum. The lithium concentration is limited as before stated with respect to the iron and cobalt intermetallic.

The ternary alloy of the improved negative electrode can be prepared by various metallurgical techniques. One preferred manner of preparing the ternary electrode material is by powder metallurgy in which the requisite amount of powders are mixed and formed under pressure such as 87 mega Pascals to form the electrode. Other metallurgical techniques such as forming a molten alloy of iron and aluminum or cobalt and aluminum or nickel and aluminum at a temperature above the melting point of aluminum but below the melting point of the iron, cobalt or nickel such as at a temperature of about 1200° C. are satisfactory. The melt is solidified and comminuted to particles of the appropriate aluminum-metal alloy in the specified proportions. The particles of alloy are integrated into a porous electrically conductive structure by compacting the particles with or without electrolyte, by vibrating or otherwise distributing the particles into a porous electrically conductive substrate or by bonding the particles with a carbonaceous thermosetting material to form a porous electrically conductive substrate.

Other metallurgical techniques can also by employed to provide an alloy composition of aluminum and either iron, cobalt, nickel or mixtures thereof. The materials may be melted together and cast or extruded into wire form. Extruded wires or elongated particles of the metal-aluminum alloy can be entangled into a porous mass and compacted. Also, a mass of wires or particles can be sintered to integrate them into a porous substrate in the desired constituent proportions. In one other method, foam metals of the preferred aluminum-metal composition can be provided using conventional techniques such as by agitating a molten alloy into a foam by quick solidification.

Lithium is preferably added to the iron, cobalt or nickel-aluminum alloy electrochemically. This can be performed as the initial charge step within an assembled cell having sufficient reaction product, e.g., lithium sulfide, to provide lithium in the negative electrode composition. However, in order to control electrode quality some or all of the lithium can be electrochemically deposited in a separate formation cell. A cell containing lithium metal in one electrode, molten salt electrolyte and a second electrode of the porous metal-aluminum alloy can be spontaneously discharged to deposit lithium into the metal-aluminum substrate. Lithium alloy can also be used to supply lithium for electrodeposition but an imposed electrical potential may be required. Such formation cells can be operated through a number of cycles to obtain uniform distribution of lithium throughout the lithium-aluminum-iron or cobalt or nickel alloy.

Various other methods may be employed in preparing the lithium-aluminum-metal electrode material. For example, an alloy of aluminum and iron, cobalt or nickel can be directly contacted with molten lithium. A melt of the lithium-aluminum-metal alloy may be prepared and cast, extruded or otherwise fabricated into the desired shape. In addition, a melt of the lithium-aluminum-metal alloy composition can be prepared in a substrate of a porous, electrically conductive metal of high melting points such as stainless steel or nickel can be submerged within the melt, removed and cooled to solidify the alloy as is taught in the Tomczuk et al. patent.

FIG. 1 illustrates an electrochemical cell that is suitable for testing the electrode composition. In practice, various cell designs may be used incorporating the present electrode composition and the method of its preparation. The electrochemical cell is shown contained within a ceramic crucible 11. The cell includes a negative electrode 13 and a positive electrode 15, both of which are submerged within a molten electrolytic salt 17. Electrode conductors 19 and 21 extend from the positive and negative electrodes respectively.

The positive electrode 15 is illustrated schematically. It includes a suitable positive electrode-active material such as a chalcogen, e.g. sulfur, selenium or tellurium, or a transition metal chalcogenide such as an oxide, sulfide, selenide of the various transition metals such as chromium, manganese, iron, cobalt, nickel, copper or molybdenum. Electrodes including the sulfides or iron, cobalt, nickel and copper are of substantial interest. These active materials can be provided in various forms including molten liquid, particulate matter distributed within an electrically conductive substrate or active material within a carbonaceous compact or plaque. Positive electrodes of these types are well known.

Electrolyte 17 within the crucible can be a molten salt composition, for instance LiCl-KCl or LiCl-LiF-KBr. Various other suitable electrolytes can be selected from those listed in U.S. Pat. No. 3,488,221. Electrolytes containing lithium ions in an organic or aqueous phase may also be suitable for use with the present negative electrode composition.

Negative electrode 13 can be in the form of a porous compact or plaque prepared by one of the methods described to include the novel electrode material. Coiled wires, coated substrates and various other forms of this novel electrode material can also be adapted for use in this application.

The cell can be assembled in the charged, partially charged or uncharged state. When uncharged material is incorporated, the positive electrode preferably includes at least sufficient uncharged material to match all of the uncharged material in the negative electrode. For example, the positive electrode should contain at least sufficient $Li_2S$ to electrochemically react with all of the aluminum and aluminum-metal alloy of the corresponding uncharged negative electrode in bringing the cell to the charged state.

EXAMPLE I

Figure 2:
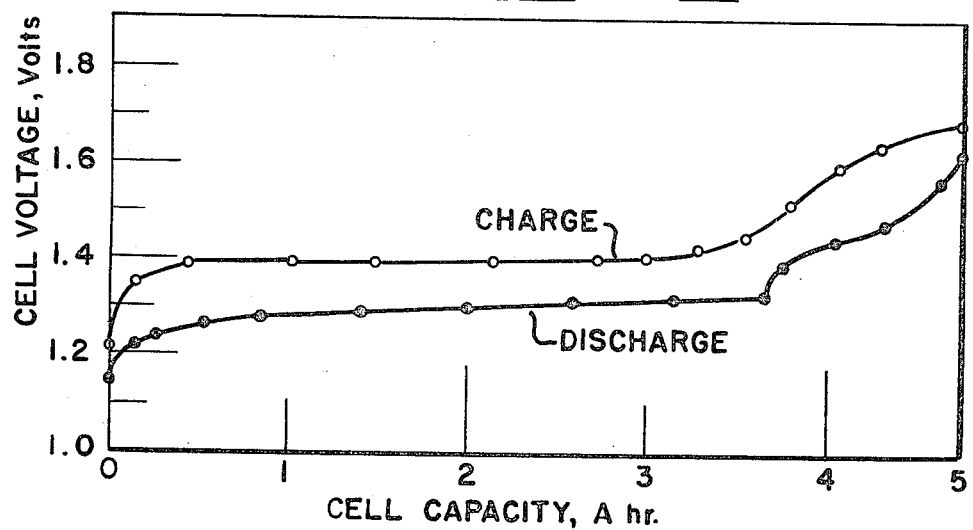
FIG. 2 is a graph of voltage versus capacity for both the charge and discharge curves using a negative electrode of the present invention.

A negative electrode is formed of 5.7 grams of lithium-aluminum having a 4.5 Ahr capacity and 1.0 g of $Li_5Al_5Fe_2$ which has about a 0.5 amp-hour capacity. The positive electrode included 32.7 grams of FeS. The two electrodes were assembled in an experimental cell similar to that illustrated in FIG. 1 with the combined lithium-aluminum-iron electrode as the negative electrode and the iron sulfide as positive electrode. Both the charge and discharge curves of the foregoing cell are illustrated in FIG. 2 in which it is shown that a substantial discontinuity of the voltage appears at substantially the fully charged position of the cell. The cell provides about 4.0 amp-hours when operated in the range of between about 1.0 and about 1.6 volts and about 4.5 amp-hours if operated in the range of between 1.0 to about 1.7 or 1.8 volts. Accordingly, it is seen that the foregoing cell has about a 10 percent overcharge capacity which is extremely useful to prevent damage to the positive electrode during charging.

The same cell can be designed with 5 percent overcharge capacity by providing about 0.5 grams of the ternary lithium-aluminum-iron alloy.

Coulombic efficiency was greater than 98 percent during the various stages of overcharge capacity utilization and this cell has completed over 80 cycles of operation. After a number of cycles of non-overcharge operation, the overcharge capacity was successfully reactivated.

EXAMPLE II

An engineering-scale cell with overcharge capacity was constructed with 12.5×12.5 cm rectangular electrodes to form a prismatic cell. The negative electrode is formed of 95 grams of lithium-aluminum having a 75 amp-hour capacity and 10.3 grams of the $Li_5Al_5Fe_2$ which has about 5 amp-hour capacity. The positive electrode included 102 grams of FeS. The positive electrode-active material was within a bonded carbonaceous substrate. The cell provides about 50 amp-hours when operated in the range of between about 1.0 and about 1.6 volts and about 55 amp-hours if operated in the range of between 1.0 to about 1.7 to 1.8 volts. Accordingly, it is seen that the foregoing cell has about a 10 percent overcharge capacity.

Reference to FIG. 3 shows the overcharge capacity of a 10 percent overcharge cell, the overcharge capacity being available for use when the cell is operated in excess of about 1.55 volts. The overcharge plateau is then activated and the cell is capable of operation at voltages up to about 1.8 volts. Discharge of the overcharge capacity is exhibited by the 1.50 discharged plateau at the beginning of discharge.

One advantage of the present invention lies in the provision of an overcharge capacity thereby permitting cell equalization on the discharge side for a plurality of series connected cells forming a battery. This is desirable to avoid the costly electronic apparatus now necessary to provide cell equalization on the charge side.

Depending upon the final utilization of the battery or cell, varying amounts of overcharge capacity may be built into the cells. For an electrical vehicle, a small amount of overcharge capacity is desired since the ternary alloy does not normally function during discharge but is present to protect cell integrity and to provide charge equalization during charging. Accordingly, the ternary alloy is dead weight during normal discharge. On the otherhand, where a stationary use is contemplated, then larger overcharge capacities on the order of 50 percent may be designed. A tradeoff is that the more ternary alloy present in the cell, the further away from the fully charged condition is the voltage discontinuity, thereby losing the advantageous placement of the voltage discontinuity at the fully charged condition. It is within the skill of the art to design the particular amount of overcharge capacity necessary for the desired end use.

While there has been provided what at present is considered to be the preferred embodiment of the present invention, it will be understood that various modifications and alterations may be made therein without departing from the scope of the invention which is intended to be covered in the claims appended hereto.

The embodiments of the invention in which an exclusive property or privilege is claimed are defined as follows:

1. A negative electrode composition for use in a secondary electrochemical cell to provide overcharge protection comprising a lithium-aluminum alloy in combination with a mixture of ternary alloys sufficient to provide a discontinuity in the cell voltage when the cell is substantially fully charged, said mixture of ternary alloys comprising lithium-aluminum nickel and a second ternary alloy selected from the group consisting of lithium aluminum-iron alloy and lithium-aluminum-cobalt alloy wherein said lithium-aluminum-nickel alloy is present in an amount less than 50% by weight of said mixture of ternary alloys.

2. The composition of claim 1, wherein the lithium-aluminum alloy contains from about 5 to about 50 atom percent lithium and from about 95 to about 50 atom percent aluminum.

3. The composition of claim 1, wherein the mixture of ternary alloys is present in an amount of between about 5 to 20 percent by weight of the electrode.

4. The composition of claim 1, wherein the mixture of ternary alloys comprise lithium-aluminum-nickel and lithium-aluminum-iron.

5. The composition of claim 4, wherein lithium is present in the mixture of ternary alloys in the range of from about 5 to 50 atom percent.

6. The composition of claim 5, wherein the lithium-aluminum-iron alloy is formed of lithium and aluminum-iron alloy wherein aluminum is present in the aluminum-iron alloy in the range of from about 65 to about 80 atom percent and iron is present in the range of from about 20 to about 35 atom percent.

7. The composition of claim 6, wherein the aluminum-iron alloy contains a major proportion of the intermetallic compound $Fe_2Al_5$.

8. The composition of claim 1, wherein the lithium-aluminum-nickel alloy is formed of lithium and aluminum-nickel alloy wherein nickel is present in the aluminum-nickel alloy in the range of from about 24 to about 42 atom percent and aluminum is present in the range of from about 58 percent to about 76 percent.

9. A negative electrode composition for use in a secondary electrochemical cell to provide overcharge protection comprising a lithium-aluminum alloy in combination with a ternary alloy sufficient to provide a discontinuity in the cell voltage when the cell is substantially fully charged, said ternary alloy including lithium-aluminum-cobalt.

10. The composition of claim 9, wherein lithium is present in the ternary alloy in an amount in the range of from about 5 to about 40 atom percent and the aluminum-cobalt alloy is present in an amount of from about 60 to about 95 atom percent.

11. The composition of claim 10, wherein aluminum is present in the aluminum-cobalt alloy in the range of from about 52 percent to about 82 percent and cobalt is present in the range of from about 18 percent to about 48 percent.

12. The composition of claim 11, wherein the aluminum-cobalt alloy contains a major proportion of the intermetallic compound $Co_2Al_5$.

13. The negative electrode composition of claim 9 wherein the ternary alloy is lithium-aluminum-cobalt present in an amount of between 5 to 20 percent by weight and the lithium aluminum alloy is present in an amount of about 80 to 95 percent by weight of the composition.

14. A secondary electrochemical cell provided with overcharge protection comprising a positive electrode containing an active material of a chalcogen or a transition metal chalcogenide, a negative electrode with a composition of about 80 to 95 weight percent lithium-aluminum alloy and about 5 to 20 weight percent of a ternary alloy mixture, said ternary alloy mixture comprising lithium-aluminum-nickel and a second ternary alloy selected from the group of ternary alloys consisting of lithium-aluminum cobalt and lithium-aluminum-iron wherein said selected second ternary alloy is present in an amount greater than about 50% by weight of the ternary alloy mixture and an electrolyte containing lithium ions in contact with both of said positive and negative electrodes.

15. The secondary electrochemical cell of claim 14, wherein said positive electrode is iron sulfide.

16. The secondary electrochemical cell of claim 14, wherein the ternary alloy mixture includes lithium-aluminum-iron.

17. The secondary electrochemical cell of claim 16, wherein the intermetallic compound of $Fe_2Al_5$ is present as a major proportion of the ternary alloy.

18. The secondary electrochemical cell of claim 14, wherein the ternary alloy mixture includes lithium-aluminum-cobalt.

19. The secondary electrochemical cell of claim 18, wherein the intermetallic compound $Co_2Al_5$ is present as a major portion of the ternary alloy.

* * * * *